United States Patent [19]

Totain

[11] Patent Number: 5,451,066

[45] Date of Patent: Sep. 19, 1995

[54] SYSTEM FOR SEALING THE BEARING OF A MACHINE, ESPECIALLY A TURBOMACHINE

[75] Inventor: Didier J. A. Totain, Mormant, France

[73] Assignee: Societe Nationale D'Etude Et De Construction De Moteurs D'Aviation "S.N.E.C.M.A.", Paris, France

[21] Appl. No.: 164,987

[22] Filed: Dec. 9, 1993

Related U.S. Application Data

[63] Continuation of Ser. No. 805,620, Dec. 12, 1991, abandoned.

[30] Foreign Application Priority Data

Dec. 19, 1990 [FR] France .................. 90 15912

[51] Int. Cl.⁶ ............................................. F16C 33/72
[52] U.S. Cl. ....................................... 277/134; 384/134
[58] Field of Search .............. 277/67, 68, 133, 134; 384/134

[56] References Cited

U.S. PATENT DOCUMENTS

| | | | |
|---|---|---|---|
| 4,971,306 | 11/1990 | Jinnouchi et al. | 277/134 |
| 5,069,278 | 12/1991 | Blair | 277/134 |
| 5,074,567 | 12/1991 | Orlowski | 277/67 |

FOREIGN PATENT DOCUMENTS

| | | |
|---|---|---|
| 0110804 | 6/1984 | European Pat. Off. . |
| 2644205 | 9/1990 | France . |
| 8903019 | 9/1990 | France . |
| 1675359 | 1/1972 | Germany . |

*Primary Examiner*—Lenard A. Footland
*Attorney, Agent, or Firm*—Oblon, Spivak, McClelland, Maier & Neustadt

[57] ABSTRACT

The invention concerns a system for sealing the bearing of a machine, especially a turbomachine, in which a shaft is disposed inside a housing which includes a partition traversed by the shaft and separating an air chamber from an oil chamber, the housing including an axial boss on the side of the oil chamber, this system further including a device for generating a flow of air for pushing back the oil, which has penetrated into the space existing between the housing and the shaft, towards the oil chamber.

9 Claims, 3 Drawing Sheets

SYSTEM FOR SEALING THE BEARING OF A MACHINE, ESPECIALLY A TURBOMACHINE

This application is a Continuation of application Ser. No. 07/805,620, filed on Dec. 12, 1991, now abandoned.

FIELD OF THE INVENTION

A shaft is frequently disposed in a machine bearing, especially a turbomachine, this shaft being required to traverse a housing partition separating two chambers, one of said chambers containing air and oil and to be hereafter denoted in the rest of this text as the oil chamber, the other chamber containing air and needing to be kept free from oil and denoted hereafter as the air chamber. Accordingly, imperviousness shall be ensured in this partition passage.

BACKGROUND OF THE INVENTION

Several solutions have been implemented to attain this aim. The patent EP-A-0 110 804 describes one embodiment example comprising one rotary gasket mounted on a shaft associated with one element forming a valve.

Another solution consists of mounting on a shaft at the level of the partition passage an equipped housing comprising an oil extraction gimlet cooperating with the external surface of the shaft and a carbon, graphite or amorphous carbon ring, possibly segmented, directly mounted and pre-assembled on the housing. This solution facilitating implementation does, however, have the drawback of rendering the device heavy and increasing costs.

Another solution described in the patent No 89 03019 consists of providing at the level of the housing an oil extraction gimlet cooperating directly with the shaft and of using an integrated gasket consisting of a segmented carbon ring forming the radial joint.

The segments are rendered integral by means of an elastic ring housed in one peripheral throat of these segments and, on their dynamic sealing face, comprising discharge cavities whose purpose is to limit the specific pressure between the carbon joint and the functioning rotor. The integrated gasket also comprises a retention ring connected to the housing by locking means.

The radial joint constituted by the segmented carbon ring is extremely effective when the pressure of the air chamber is greater than that of the oil chamber. Imperviousness is improved by adding the additional system constituted by the oil extraction gimlet, but remains insufficient for certain cases of operation.

In fact, the play existing between the gimlet and the shaft to too large so as to ensure a sufficient extraction of oil as it has been established that all the oil nevertheless manages to traverse this gimlet and goes past the carbon joint so as to reach the air chamber.

Now, this play is brought about by the functioning of the motor and thus allows for functioning at both high and low rates.

The imperviousness system described in this patent does not therefore make it possible to obtain full imperviousness for all the possible operating configurations of the motor.

SUMMARY OF THE INVENTION

The solution put forward by the invention avoids the various drawbacks of previous known solutions.

More specifically, the object of the invention is to provide an imperviousness system for the bearing of a machine, particularly a turbomachine, in which a shaft is disposed inside a housing comprising a partition traversed by the shaft and separating one air chamber from one oil chamber, the housing comprising an axial casing on the side of the oil chamber, said invention being mainly characterized in that it includes a device for generating a flow of air so as to push back the oil, which would penetrate into the space existing between the housing and the shaft, into the original oil chamber.

According to one characteristic of the invention, the air flow generating device includes at least one air intake provided inside the axial casing of the housing, and one air source introducing air by means of this intake into the space existing between the axial casing of the housing and the shaft so as to push back the oil towards the oil chamber.

According to another characteristic of the invention, the imperviousness system includes one sealing gasket integrated in the housing and disposed between the shaft and the partition in another housing provided in the housing and an air generating device composed of one air feeding source and air compression means making it possible to increase the pressure difference between the air intake in the casing and the outlet of the casing, the system functioning as an air pump.

According to another characteristic of the invention, the compression means are partly embodied by the axial hollow, substantially cylindrical support which comprises an oil extraction gimlet opposite the external surface of the shaft.

The pressure between the inlet of the oil extraction gimlet and its outlet may be increased by embodying a variable pitch gimlet. This pressure may also be increased by embodying a gimlet able to vary the height of the thread.

The effect of the air pump may be strengthened by embodying patterns forming obstacles obstructing the air flow around the shaft opposite the oil extraction gimlet so as to increase the actuation of air when the shaft is rotating and thus improve the flow back of oil. The pump effect is due to the combination of two elements:

actuation of the rotating air by the shaft,
routing this air by the gimlet towards the oil chamber
  by virtue of a section evolution (variable pitch)
  which makes it possible to improve the system by
  accelerating and compressing the air traversing it.

The patterns may be formed of axial grooves or slanted grooves or even a gimlet.

According to another characteristic of the invention, the air flow is obtained by means of an air source formed by the air present in the oil chamber, the oil chamber comprising to this effect oil retention means preventing this oil from entering into the housing/rotor space.

The oil extraction means of the air feed system may be constituted by a multiperforated deflector associated with means for draining the oil picked up by the deflector.

According to a further characteristic of the invention, the air source originates from a zone protected from the oil chamber.

According to another characteristic of the invention, the air flow may be obtained by a source outside the bearing.

BRIEF DESCRIPTION OF THE DRAWINGS

Other characteristics and advantages of the invention shall appear more readily from a reading of the following description, given by way of non-restrictive example, with reference to the drawings on which.

DETAILED DESCRIPTION OF THE PREFERRED EMBODIMENTS

Figure 1:
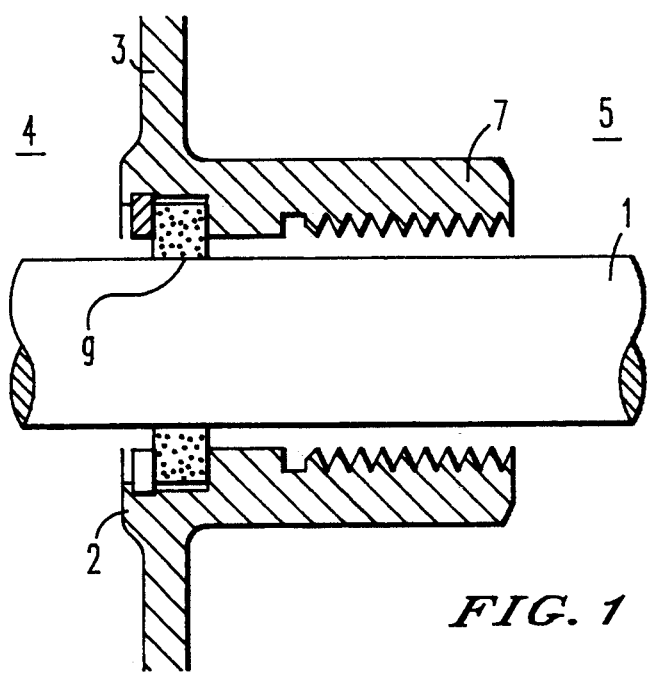
FIG. 1 shows the bearing of a machine with an imperviousness system according to the prior art.

FIG. 1 shows an imperviousness system conforming to the prior art, as described for example in the French patent application No 89 03019.

Figure 2:
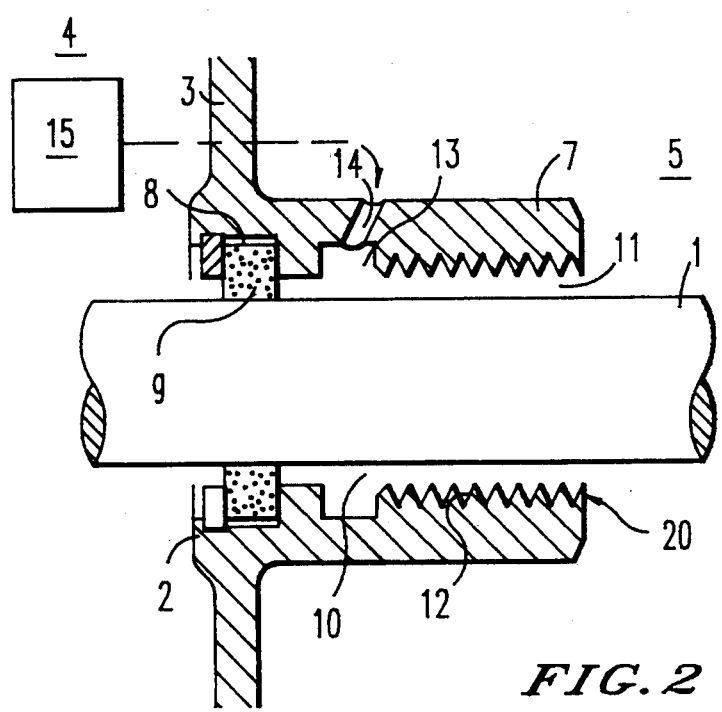
FIG. 2 shows a bearing imperviousness system provided with compression means in accordance with the invention.

FIG. 2 shows a bearing sealing system conforming to the invention. In a known type of machine or turbomachine bearing, a shaft 1 is rotary supported by a bearing, only one portion of this bearing being shown on this figure. A housing 2 comprises a partition 3 which provides two bearing chambers, one air chamber 4 on one side of the partition 3, and one oil chamber 5 which contains both air and oil on the other side of this partition. The housing 2 comprises an axial hollow, substantially cylindrical support 7 disposed opposite the external surface of the shaft 1.

An annular housing 8 is fitted in the housing at the internal radial extremity of the partition 3 for separating the chambers 4 and 5, a gasket 9 mounted on the housing 2 being placed in said housing.

An annular air flow groove 13 has been formed in the axial hollow, substantially cylindrical support 7 between the location of the joint and the inlet section 10 of the boss 7. The housing 2 has been perforated so as to embody an air intake ending inside the space delimited by the throat.

An air flow may thus may introduced by means of this intake into the annular groove and be driven by the rotating shaft under the effect of friction and thus is able to push back the oil which tends to penetrate into the space existing between the housing and the shaft. Thus, the air current generated with the aid of the source 15 pushes back the oil into the oil chamber.

The gasket 9 may be of any known type. For example, it is possible to use a standard carbon segmented radial joint or a brush joint.

The air flow generating device thus carries out the functions of a minicompressor. In fact, it makes it possible to channel the air penetrating via an inlet 14, this air being moved by the rotating shaft and ejected into the oil chamber with a maximum amount of efficiency.

So as to increase to maximum the speed and outlet flow of the air penetrating into the inlet 14, means may be provided so as to increase the inlet section 120 with respect to the outlet section 11.

These means consist of making the air passage sections evolve, the effect of this being to increase the pressure differences existing between the inlet 10 and the outlet 11 of the minicompressor. Thus, the axial support 7 is equipped with a helical wheel or gimlet 20 with an evolutive section. The pitch of the threads 12 of the gimlet may be variable so as to reduce in size from the inlet 10 towards the outlet 11. Another way of increasing the pressure differences between the inlet 10 and the outlet 11 may consist of embodying a gimlet 20 whose thread height is variable and gradually increases towards the outlet 11 (FIG. 3).

It is possible to combine with these means other means able to increase the capacity of the shaft for driving the rotating air. Various possible solutions have been shown on FIGS. 3, 4a, 4b and 5. These solutions consist of embodying patterns on the shaft 1. Depending on the type of application, it is possible to embody a dynamic gimlet on the shaft 1.

Figure 3:
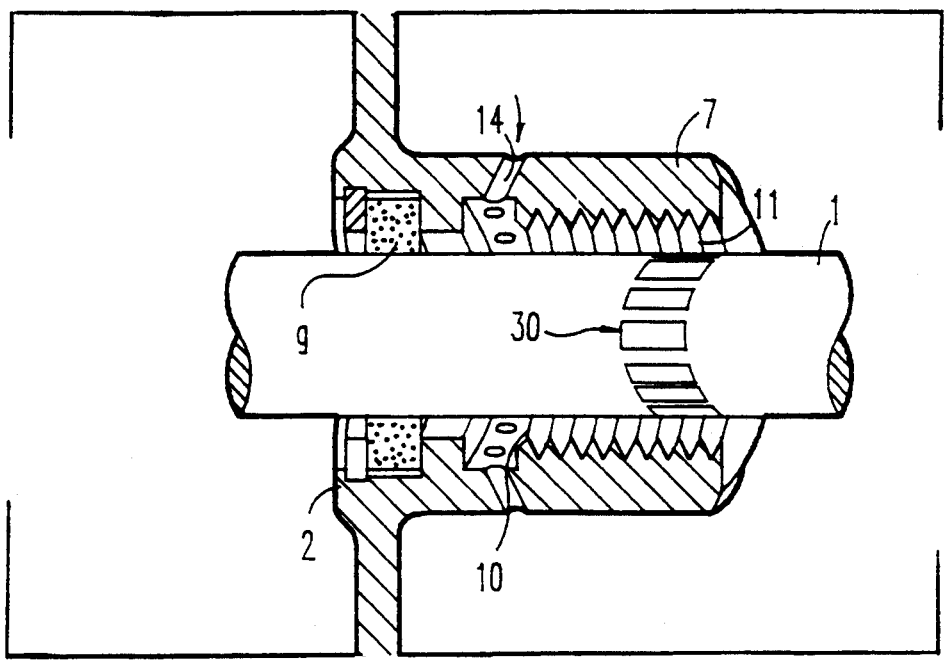
FIGS. 3, 4a, 4b and 5 show the embodiment variants of patterns embodied on the motor shaft.
Figure 4A:
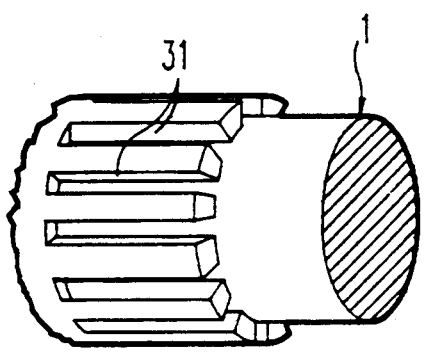
Figure 4B:
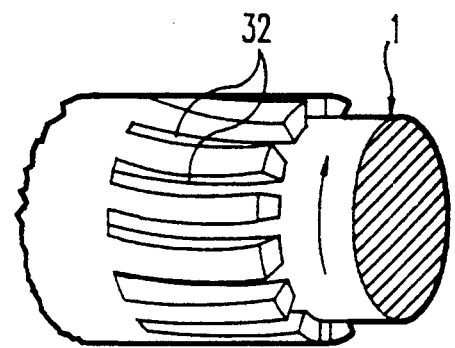

FIG. 3 shows a shaft on which bevels 30 are embodied. In the case of FIG. 4a, the patterns are grooves 31 disposed inside the axis of the shaft 1. FIG. 4b shows the patterns made up of grooves slanted with respect to the axis of the shaft 1.

Figure 5:
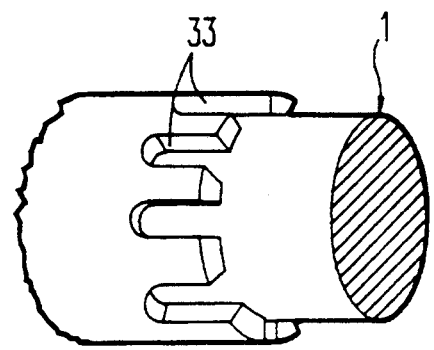

FIG. 5 shows scoops able to be obtained by milling, for example.

The air source (15) is able to feed the minicompressor. Obviously, it must not carry any oil. In accordance with the invention, the air source may be outside the bearing or be internal. Thus, the air may be taken from the oil chamber. In order to do this, the air needs to be purified from oil.

Figure 6:
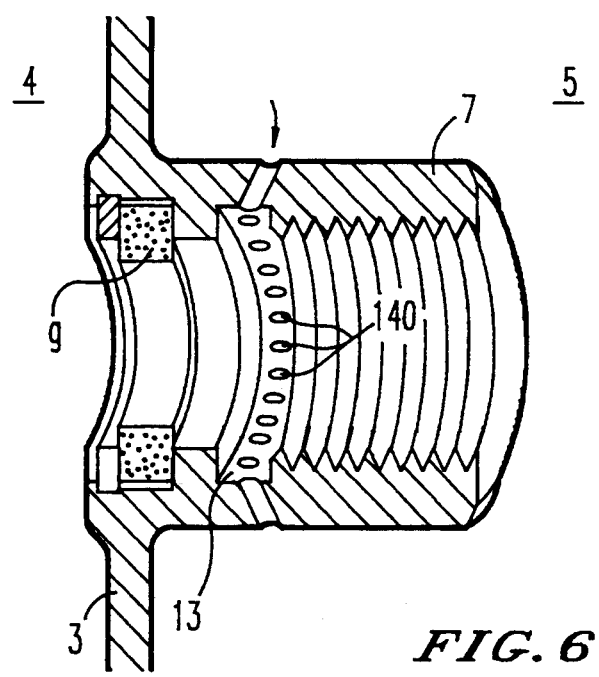
FIG. 6 illustrates the multiperforations where the air source originates from the oil chamber.

FIG. 6 shows one embodiment adapted for an internal taking of air from the oil chamber. The air intake is embodied in this case by a multiperforation system 140. These multiperforations 140 embodied in the housing close to the disengaging mechanism throat make it possible to distribute the air originating from the oil chamber at the level of the intakes while enabling the oil to be blocked off.

Figure 7:
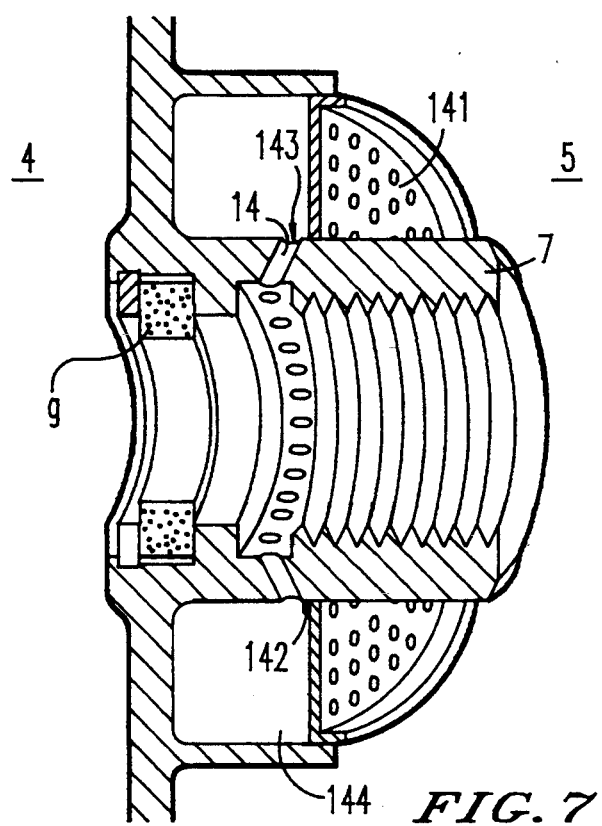
FIG. 7 shows a multiperforated deflector when the air source originates from the oil chamber.

FIG. 7 shows another embodiment making it possible to use the air of the oil chamber as a source. According to this embodiment, a multiperforated deflector 141 is placed inside the oil chamber so as to allow for condensation of the oil on the plate and send it back to the oil chamber by means of firstly a recovery throat 142 edged by a small circumferential collar 143 and secondly a reintroduction hole 144 situated at the bottom. Thus, the air penetrating via the inlet 14 is purified from the oil of the oil chamber.

Another solution may consist of using an air source not taken directly from the oil chamber. This air source may be outside the chamber. The intake 14 shall in this case be connected by a pipe to the external air source. In the case of a turbomachine, this source may be constituted by the air of the boat, but in all the cases involved, it needs to be at a pressure at least equal to and preferably greater than the pressure of the oil chamber and be compatible with the aerothermic functioning of the motor.

What is claimed is:

1. A sealing member for a bearing of a motor, which comprises:
 a first housing having an air chamber and an oil chamber wherein said oil chamber contains oil and air;
 a partition separating said air chamber from said oil chamber, said partition having an opening formed therein, and said partition having a groove formed therein:
 a gasket mounted in said groove in said partition;
 a shaft which passes through said opening in said partition, an axial hollow, substantially cylindrical support located in said first housing on an oil chamber side of the partition and within which a portion of said shaft is located so that a space is formed therebetween, said support having an inlet formed therein and a groove with which said inlet is communicated; and an air source for supplying air from said oil chamber to said groove of said support via said inlet of said support so as to communicate air to said space between said support and said shaft for pushing back oil from the oil chamber which has penetrated into said space existing between said support and said shaft and so as to force the oil in the space between said support and said shaft towards the oil chamber.

2. A sealing member according to claim 1, wherein the axial support comprises an oil extraction gimlet positioned opposite the external surface of the shaft.

3. Impervious system according to claim 2, wherein the surface of the shaft opposite the oil extraction gimlet forms a plurality of scoops.

4. A sealing member according to claim 2, wherein the oil extraction gimlet has variable pitch.

5. A sealing member according to claim 1, wherein said air source comprises an air compressor for increasing the pressure difference existing between the inlet section in the axial support and the support outlet.

6. A sealing member according to claim 1, wherein the surface of the shaft opposite along with an oil extraction gimlet comprises patterns for driving the air when the shaft is rotating and for pushing back the oil.

7. A sealing member according to claim 6, wherein the patterns are grooves.

8. A sealing member according to claim 6, wherein the patterns are bevels.

9. A sealing member according to claim 1, wherein the oil retention means are constituted by a multiperforated deflector.

* * * * *